United States Patent
Xie et al.

(10) Patent No.: US 8,699,889 B2
(45) Date of Patent: Apr. 15, 2014

(54) POLARIZATION DEMULTIPLEXING USING INDEPENDENT COMPONENT ANALYSIS

(75) Inventors: Xiaobo Xie, Orlando, FL (US); Guifang Li, Orlando, FL (US); Fatih Yaman, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 446 days.

(21) Appl. No.: 13/071,499

(22) Filed: Mar. 24, 2011

(65) Prior Publication Data

US 2011/0255858 A1  Oct. 20, 2011

Related U.S. Application Data

(60) Provisional application No. 61/317,131, filed on Mar. 24, 2010.

(51) Int. Cl.
*H04B 10/06* (2011.01)
*H04J 14/04* (2006.01)

(52) U.S. Cl.
USPC .................. 398/208; 398/212; 398/214

(58) Field of Classification Search
USPC ........... 398/44, 65, 152, 184, 205, 208–211
See application file for complete search history.

(56) References Cited

U.S. PATENT DOCUMENTS

| | | | | |
|---|---|---|---|---|
| 6,535,666 | B1 * | 3/2003 | Dogan et al. | 385/31 |
| 2010/0003028 | A1 * | 1/2010 | Zhang et al. | 398/65 |
| 2010/0054737 | A1 * | 3/2010 | Saperstein et al. | 398/65 |
| 2010/0196004 | A1 * | 8/2010 | Grier | 398/43 |
| 2010/0296819 | A1 * | 11/2010 | Kahn et al. | 398/158 |
| 2010/0329670 | A1 * | 12/2010 | Essiambre et al. | 398/43 |
| 2010/0329671 | A1 * | 12/2010 | Essiambre et al. | 398/44 |

OTHER PUBLICATIONS

Zhang et al., "Polarization Demultiplexing Based on Independent Component Analysis in Optical Coherent Receivers", Sep. 25, 2008, Optical Communication, 2008. ECOC 2008. 34th European Conferenct on, pp. 1-2.*

* cited by examiner

*Primary Examiner* — Daniel Dobson
(74) *Attorney, Agent, or Firm* — Thomas | Horstemeyer, LLP

(57) ABSTRACT

Systems and methods of polarization demultiplexing are disclosed. One such method receives a transmitted polarization-multiplexed optical signal The polarization-multiplexed has multiple polarizations, each of which represents an independent data stream. The method converts the polarization-multiplexed optical signal to a corresponding polarization-multiplexed electrical signal. The method determines an inverse transformation matrix that meets an independent component analysis (ICA) criterion. The method applies the inverse transformation matrix to the polarization-multiplexed electrical signal, which produces a polarization-demultiplexed electrical signal. The method phase estimates the polarization-demultiplexed electrical signal to recover the data stream.

19 Claims, 4 Drawing Sheets

POLARIZATION DEMULTIPLEXING USING INDEPENDENT COMPONENT ANALYSIS

CROSS-REFERENCE TO RELATED APPLICATIONS

This application claims priority to U.S. Provisional Application having Ser. No. 61/317,131 filed Mar. 24, 2010, which is hereby incorporated by reference herein in its entirety.

FIELD OF THE DISCLOSURE

The present disclosure relates to optical communication, and more specifically to optical communication using polarization multiplexing.

BACKGROUND

The transmission capacity of optical communication systems is limited by the spectral range of the optical fiber. One way to increase spectral efficiency is to multiplex data streams data using different polarizations of light. However, due to random birefringence in the optical fiber, signals carried in different polarizations experience polarization mixing or even polarization mode dispersion (PMD). This requires polarization demultiplexing or PMD compensation in the receiver in order to correctly recover the transmitted signals.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
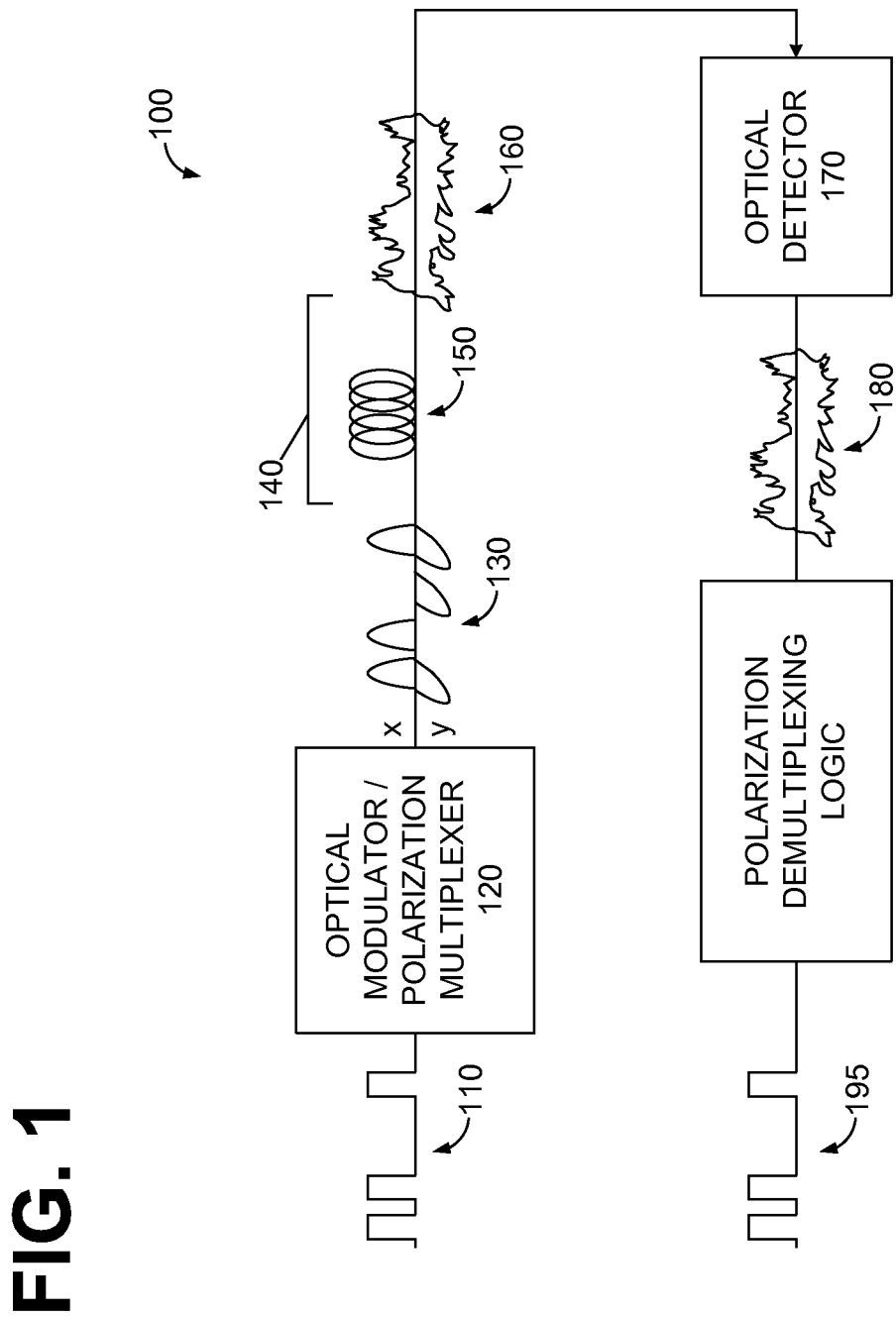
FIG. 1 is a system model diagram of an optical communication system including an embodiment of polarization demultiplexing logic.

FIG. 1 is a system model diagram of an optical communication system including an embodiment of polarization demultiplexing logic. Transmitted data is carried by an electrical signal 110, which is provided to an optical modulator and polarization multiplexer 120. Modulator/multiplexer 120 produces a (modulated) optical signal 130 which includes x and y polarization components, i.e., a polarization-division multiplexed signal. In some embodiments, x and y are orthogonal. Various forms of modulation can be used, such as quadrature-phase shift keying (QPSK) and quadrature amplification (QAM), among others. Furthermore, although the system diagram of FIG. 1 does not depict multiple frequencies, it should be appreciated that the principles described herein can be extended to and/or combined with other forms of multiplexing such as wavelength-division multiplexing.

Polarization-multiplexed optical signal 130 travels through an optical channel 140, which includes optical fiber 150. Various types of optical fibers can be used, as should be appreciated, including single mode fiber and multimode fiber. Optical fiber 150 introduces various types of distortion, resulting in a distorted optical signal 160. Distorted optical signal 160 is provided to an optical detector 170, which converts the distorted optical signal to a signal in the electrical domain. Distorted electrical signal 180 is processed in the electrical (digital) domain by polarization demultiplexing logic 190. The output of polarization demultiplexing logic 190 is a demultiplexed electrical signal 195. Carried within demultiplexed electrical signal 195 is data which is a replica (or near replica) of the originally transmitted data.

The transmitted signal 130 is a mixed signal of multiple polarization components. Optical detector 170, acting as part of a coherent optical receiver, converts this mixed signal to the electrical domain. In doing so, the optical detector 170 records optical fields in multiple polarizations, as well as phase and quadrature components of the electrical field. By using a polarization diversity receiver, the polarization demultiplexing described herein can be independent of the modulation format. In contrast, many conventional methods of polarization demultiplexing are dependent on a particular modulation format.

These components of the mixed signal, produced by the coherent optical receiver, are then operated on in the electrical domain by polarization demultiplexing logic 190. As described in further detail herein, polarization demultiplexing logic 190 uses independent component analysis (ICA) to separate or demultiplex the independent polarization component signals carried within the mixed polarization signal. The originally transmitted data stream then can be recovered from the separated signals.

In some embodiments, the polarization demultiplexing logic 190 also performs polarization dispersion compensation (PMD). As applied by the embodiments described herein, polarization demultiplexing can be considered a special case of PMD compensation.

Figure 2:
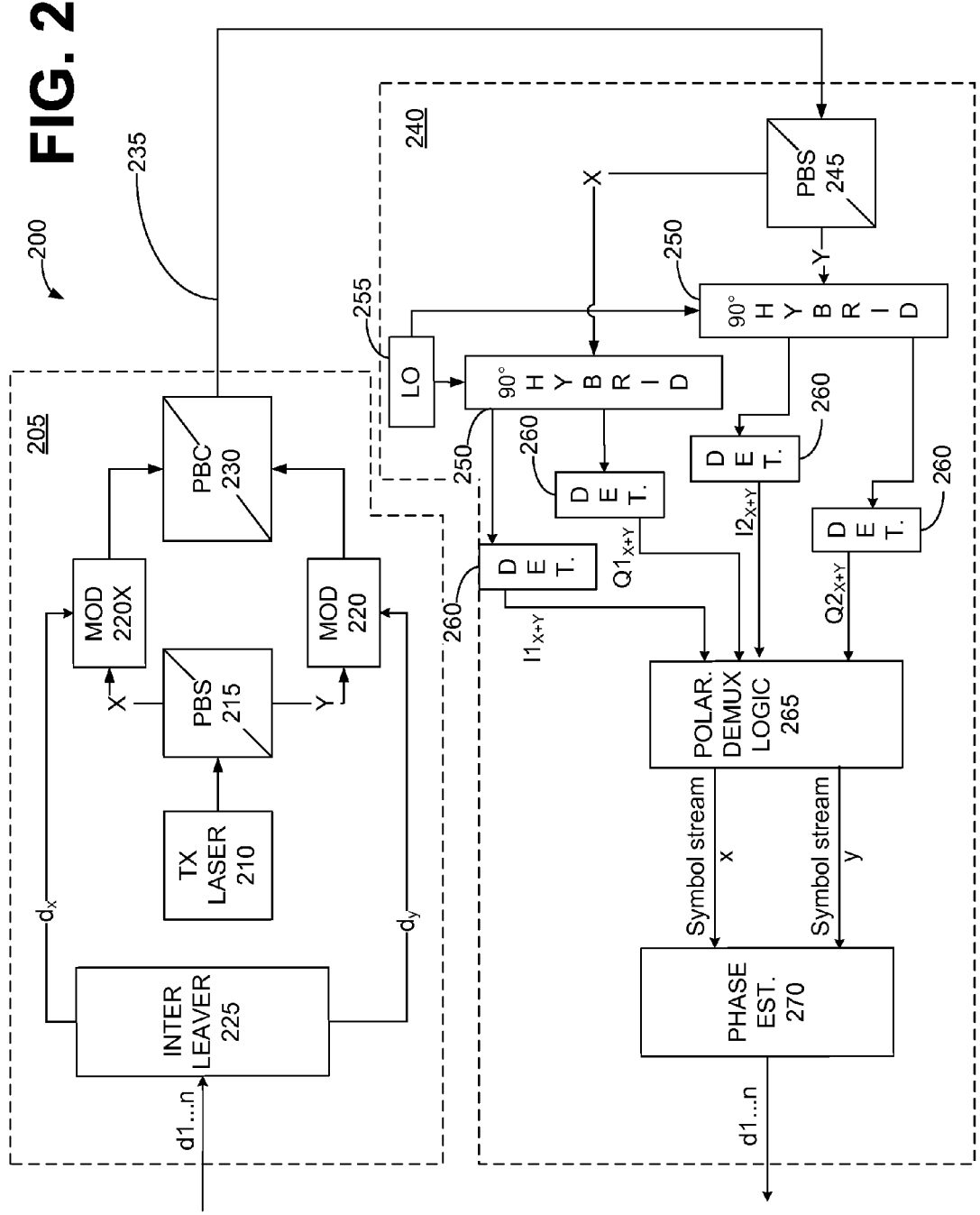
FIG. 2 is a block diagram of a polarization division multiplexing communication system utilizing the polarization demultiplexing logic of FIG. 1, according to some embodiments.

FIG. 2 is a block diagram of an optical communication system utilizing an embodiment of polarization demultiplexing logic 190. Polarization demultiplexing is performed in the digital domain after coherent detection. Transmitter 205 includes a laser 210, with the optical signal output from laser 210 being supplied to a polarization beam splitter 215. After the laser output is split by polarization beam splitter 215, optical signals having individual polarization components are provided to a plurality of optical modulators 220, one for each polarization component.

An interleaver 225 separates a data stream and supplies a tributary stream to each modulator 220. Each modulator 220 modulates the polarized optical signal produced by polarization beam splitter 215 according to a subset of the (electrical) data signals from interleaver 225. The signals output from a particular modulator 220 are thus associated with a particular polarization component.

In this example, modulator 220X modulates bits $d1_X$ to $dN_X$, where N is dependent on the interleaver. The signals $d_X$ that are output from modulator 220X are thus associated with a particular polarization component, here X. Another modulator 220Y modulates according to another subset of data signals $d1_Y$ to $dN_Y$, and are thus associated with a different polarization component, here Y. A polarization controller 230 combines the polarization channels. In some embodiments, the polarization controller 230 also adjusts the state of polarization of each channel as appropriate.

In this example, the modulators 220 share the same carrier frequency. In other embodiments, the modulators use different frequencies, and the wavelengths are combined by a multiplexer which performs wavelength-division multiplexing. In this manner, polarization multiplexing is combined with wavelength-division multiplexing.

The polarization-division multiplexed signal is transmitted over one or more optical fiber spans 235. It should be appreciated that various technologies and mechanisms can be used for amplification and modulation. After transmission over spans 235, the polarization-division multiplexed signal is received at a receiver 240. Impairments in the optical fibers cause effects such as random bifringence and random polarization rotation. The resulting distortion of the optical signal causes polarization components to be mixed at the receiver 240.

At receiver 240, another polarization bream splitter 245 separates the received distorted signal into polarization-specific tributaries. Receiver 240 uses 90° optical hybrids 250 to mix each polarization-specific tributaries with a local oscillator 255. Each hybrid 250 is supplied with an oscillator signal having the same polarization, produced by another polarization splitter at the local oscillator output.

Each hybrid 250 outputs to a pair of balanced photo-detectors 260. Each pair of photo-detectors 269 obtains in-phase and quadrature components for a polarization tributary of the polarization-division multiplexed signal. All I and Q components of the polarization-multiplexed signal are provided to polarization demultiplexing logic 265.

Polarization demultiplexing logic 265 separates the mixed polarization signal using independent component analysis (ICA) as described herein. Finally, the originally transmitted data is estimated by phase estimator 270 and de-interleaving is performed if appropriate. Data recovery of the originally transmitted stream is then complete. In this manner, the mixed polarization signal is unmixed, the signal constellations are recovered, and the symbols are recovered to produce the originally transmitted data bit stream.

In a polarization multiplexed system, the output signals are linear mixtures of the input signals, so that the output and input signals are related by a matrix. Polarization demultiplexing logic 265 obtains the input signals from the output signals by finding the inverse transformation matrix can be found.

Independent component analysis relies on the assumption of statistical independence of the input signals to evaluate the transformation matrix only from the output signals. With polarization demultiplexing having two inputs and two outputs, the ICA criterion can be expressed as follows:

$$p_{xy}(E_x,E_y)=p_x(E_x)p_y(E_y) \quad (1)$$

where $p_{xy}$ is the joint probability distribution function (pdf) of two orthogonal polarizations while $p_x(E_x)$ and $p_y(E_y)$ are marginal pdfs of and polarization, respectively. In some embodiments, high order cumulants are used to determine statistical independence rather than pdfs. According to the central limit theorem, the statistics of a mixed signal tends to be more Gaussian compared with its independent components. Since high order cumulants of a Gaussian signal are all zero, they can be used to evaluate the Gaussianity of a signal and to be used in ICA.

In polarization demultiplexing, the matrix linking the output signals to the input signals is a unitary matrix. A unitary matrix in general has four free parameters. Two of them can be corrected during digital phase estimation, leaving only two parameters to be determined by polarization demultiplexing logic 265. Hence, the unitary matrix required for polarization demultiplexing can be expressed as $$U = \begin{pmatrix} \cos(\alpha) & \sin(ae^{j\vartheta}) \\ -\sin(ae^{-j\vartheta}) & \cos(\alpha) \end{pmatrix}$$

where $\alpha$ and $e$ are two free parameters to be obtained.

Various algorithms can be used to implement ICA, as should be appreciated. Some embodiments use the tensor-based algorithm. The tensor-based algorithm uses marginal kurtosis, the fourth-order marginal cumulant, as the indicator to find independent components. The contrast function is defined as $$\phi = K_{1111} + K_{2222} \quad (3)$$

where $K_{1111}$ and $K_{2222}$ are marginal kurtoses of the two orthogonal polarizations. Kurtosis itself is a tensor under unitary rotation. Its dependence on unitary rotation (and) can be calculated analytically. In optical communication, signal pdfs are sub-Gaussian and their marginal kurtoses are negative. The further the marginal kurtoses are from zero, the less Gaussian and more independent the signals are. Therefore, polarization demultiplexing logic 265 determines the correct unitary transformation matrix by minimizing the contrast function. The advantage of the tensor-based algorithm compared with stochastic gradient descent is it does not need any initial values and step size to start with and does not have convergence problems Some embodiments of polarization demultiplexing logic 265 use constant modulus as an ICA criterion. In the case of polarization demultiplexing, expressed as $$\begin{pmatrix} y_1 \\ y_2 \end{pmatrix} = \begin{pmatrix} h_{12} & h_{12} \\ h_{21} & h_{22} \end{pmatrix} \begin{pmatrix} x_1 \\ x_2 \end{pmatrix}$$

the cost function can be expressed as $$F = \overline{(|y_1|^p - R_{p1})^2} + \overline{(|y_2|^p - R_{p2})^2}$$

where Rp1 and Rp2 are the expected constant moduli for two polarizations. For communication signals, Rp1 and Rp2 are set to be $$R_p = \frac{\overline{|\alpha|^{2p}}}{\overline{|\alpha|^p}}$$

where $\alpha$ is transmitted symbols. The update process for matrix H, following a stochastic gradient descent algorithm (SGD), is calculated as $$h_{ij} \rightarrow h_{ij} - 2\alpha \overline{p(|y_i|^p - R_{pi})y_i|^{p-2}y_ix_j^*}$$

Some embodiments simplify the algorithm by using p=2 and $$h_{ij} \rightarrow h_{ij} - 4\alpha \overline{(|y_i|^2 - R_{2i})y_ix_j^*}$$

For PMD compensation using constant modulus as an ICA criterion, the relationship between Y and X is convolution by butterfly filters as $$\begin{pmatrix} y_1 \\ y_2 \end{pmatrix} = \begin{pmatrix} h_{11} & h_{12} \\ h_{21} & h_{22} \end{pmatrix} * \begin{pmatrix} x_1 \\ x_2 \end{pmatrix}$$

so $$y_1(k) = \sum_1^{tap} [h_{11}(l)x_1(k+1-l) + h_{12}(l)x_2(k+1-l)]$$

$$y_2(k) = \sum_1^{tap} [h_{21}(l)x_1(k+1-l) + h_{22}(l)x_2(k+1-l)]$$

Now the updating process for filter elements is $$h_{ij}(l) \rightarrow h_{ij}(l) - 4\alpha \overline{(|y_i(k)|^2 - R_{2i})y_i(k)x_j(k+1-l)^*}$$

Polarization demultiplexer logic 265 uses independent component analysis (ICA) to separate independent signals from their mixtures. The waveforms of the mixed signal are related to the independent signals by a linear relationship, which can be mathematically represented by a matrix as follows, $$\begin{pmatrix} \alpha_1 \\ \cdots \\ \alpha_N \end{pmatrix} = \begin{pmatrix} q_{11} & \cdots & q_{1M} \\ \cdots & \cdots & \cdots \\ q_{N1} & \cdots & q_{NM} \end{pmatrix} \begin{pmatrix} s_1 \\ \cdots \\ s_M \end{pmatrix}$$

where $A=(\alpha_1, \ldots, \alpha_N)T$ and $S=(s_1, \ldots, s_M)T$ are waveforms at N receivers and M transmitters, respectively. The matrix relating S and A is the transformation matrix Q. The reverse of the relationship would be $$\begin{pmatrix} s_1 \\ \vdots \\ s_M \end{pmatrix} = \begin{pmatrix} q_{11} & \cdots & q_{1N} \\ \vdots & \ddots & \vdots \\ q_{M1} & \cdots & q_{MN} \end{pmatrix}^{-1} \begin{pmatrix} \alpha_1 \\ \vdots \\ \alpha_N \end{pmatrix}$$

Polarization demultiplexer logic 265 solves the problem by discovering a matrix H so that $$\begin{pmatrix} s'_1 \\ \vdots \\ s'_M \end{pmatrix} = \begin{pmatrix} h_{11} & \cdots & h_{1N} \\ \vdots & \ddots & \vdots \\ h_{M1} & \cdots & h_{MN} \end{pmatrix}^{-1} \begin{pmatrix} \alpha_1 \\ \vdots \\ \alpha_N \end{pmatrix}$$

and S' is as close as to the original signal S except for only scaling factors and order. Polarization demultiplexer logic 265 uses ICA to compute the matrix H from the knowledge of A and the property of statistical independence of elements of S. The principle of the ICA is to seek a transformation matrix H that would make the components of S' as statistically independent as possible such that $$p(s_1', s_2', \ldots, s_M') = p(s_1')p(s_2') \ldots p(s_M')$$

where p denotes the probability density function (PDF) of respective signal or signals. In some embodiments, this is accomplished by finding a cost function for optimization. According to central limit theorem, a mixture of independent signals tends to be distributed as Gaussian. In other words, independent signals are less Gaussian than their mixtures. Therefore, some embodiments of polarization demultiplexer logic 265 use Gaussianity as a criterion for ICA. Some embodiments quantitatively qualify Gaussianity using high order cumulants. A fourth-order cumulant called kurtosis can be used.

A Gaussian signal only has non-zero cumulants up to the second order and all high-order cumulants beyond are zero. Therefore, a kurtosis further from zero means less Gaussianity for the signal. The cross-kurtosis of complex signals $z_i$, $z_j$, $z_k$, $z_l$ is defined as follows, $$c_{ijkl} = \overline{z_i z_j^* z_k^* z_l} - \overline{z_i z_j^*} \cdot \overline{z_k^* z_l} - \overline{z_i z_k^*} \cdot \overline{z_j^* z_l} - \overline{z_i z_l} \cdot \overline{z_j^* z_k^*}$$

For kurtosis of a single signal, it can be simplified to $$c_{iiii} = \overline{|z_i|^4} - 2(\overline{|z_i|^2})^2 - \overline{z_i^2} \cdot \overline{z_i^{*2}}$$

The recorded waveforms A are known. Some embodiments of polarization demultiplexer logic 265 then calculate the transformation matrix H to make the kurtosis of si' furthest from zero. For polarization demultiplexing, matrix H is a 2×2 matrix. If the received signals in two polarizations are (x1, x2)T and the demultiplexed signals are (y1, y2)T, then the following relationship exists.

$$\begin{pmatrix} y_1 \\ y_2 \end{pmatrix} = \begin{pmatrix} h_{11} & h_{12} \\ h_{21} & h_{22} \end{pmatrix} \begin{pmatrix} x_1 \\ x_2 \end{pmatrix}$$

Since communications signals are sub-Gaussian, whose kurtosis is less than zero, some embodiments of polarization demultiplexer logic 265 minimize the kurtoses of y1 and y2. By using kurtosis as the cost function, the matrix elements of H are updated according to stochastic gradient descent algorithm as follows.

$$h_{ij} \rightarrow h_{ij} - \frac{\alpha}{4} \frac{\partial c_{iiii}}{\partial h_{ij}} = h_{ij} - \alpha\left(\overline{|y_i|^2 y_i x_j^*} - 2\overline{|y_i|^2} \cdot \overline{y_i x_j^*} - \overline{y_i^2} \cdot \overline{y_i^* x_j^*}\right)$$

After each update process, H is renormalized as follows $$h_{ij} = \frac{h_{ij}}{\sqrt{|h_{i1}|^2 + |h_{i2}|^2}}$$

A useful result here for derivative calculation is $$\frac{\partial |y_i|}{\partial h_{ij}} = \frac{x_i x_j}{|y_i|}$$

The discussion above described using ICA and a transformation matrix to perform polarization demultiplexing. The transformation matrix can also be used by polarization demultiplexer logic 265 to calculate filter coefficients to perform PMD compensation. For PMD compensation, the relationship between Y and X is convolution by butterfly filters as $$\begin{pmatrix} y_1 \\ y_2 \end{pmatrix} = \begin{pmatrix} h_{11} & h_{12} \\ h_{21} & h_{22} \end{pmatrix} * \begin{pmatrix} x_1 \\ x_2 \end{pmatrix}$$

So $$y_1(k) = \sum_l^{tap} [h_{11}(l)x_1(k+1-l) + h_{12}(l)x_2(k+1-l)]$$

$$y_2(k) = \sum_l^{tap} [h_{21}(l)x_1(k+1-l) + h_{22}(l)x_2(k+1-l)]$$

The updating process for the filter elements is $$h_{ij}(l) \rightarrow h_{ij}(l) - \alpha(|y_i(k)|^2 y_i(k)x_j(k+1-l)^* - 2|y_i(k)|^2 \cdot y_i(k)x_j(k+1-l)^* - y_i(k)^* x_j(k+1-l)^*)$$

The example embodiments described above use independent component analysis (ICA) to perform polarization demultiplexing with or without PMD compensation. However, these techniques are not limited to two streams of independent data carried on two degrees of freedom. The techniques are also applicable to provide additional degrees of freedom, which can expand transmission capacity. For example, another embodiment of polarization demultiplexing using ICA is employed in an optical communication system in which independent data streams are carried on different spatial modes of a multimode fiber.

The concept of principal state of polarization (PSP) of a single mode fiber can be extended to principal modes in a multimode fiber. Another embodiment of polarization demultiplexing using ICA is employed in an optical communication system in which data streams carried in multiple (two or more) modes in multimode fiber are coupled to each other in a manner analogous to carrying data stream on two polarizations of the single mode of the single-mode fiber. In this manner, independent component analysis is applied to the separation or demultiplexing of mode-division multiplexed optical transmission.

An optical communication system using such an embodiment includes a mode-division multiplexed transmitter, a mode-division demultiplexed receiver, and a multimode optical fiber 300 coupling the mode-division multiplexed transmitter and the mode-division demultiplexed receiver. The mode-division demultiplexing receiver includes an optical detector configured to convert the received signal to a corresponding electrical signal. Polarization demultiplexer logic 265 then performs mode-division demultiplexing on the mode-division multiplexed electrical signal by using ICA to find an inverse transformation matrix that is statistically independent, then applying the inverse transformation matrix to the mode-division multiplexed electrical signal to produce a mode-division demultiplexed electrical signal. Phase estimation is then performed on the polarization-demultiplexed electrical signal to recover the data stream.

Figure 3:
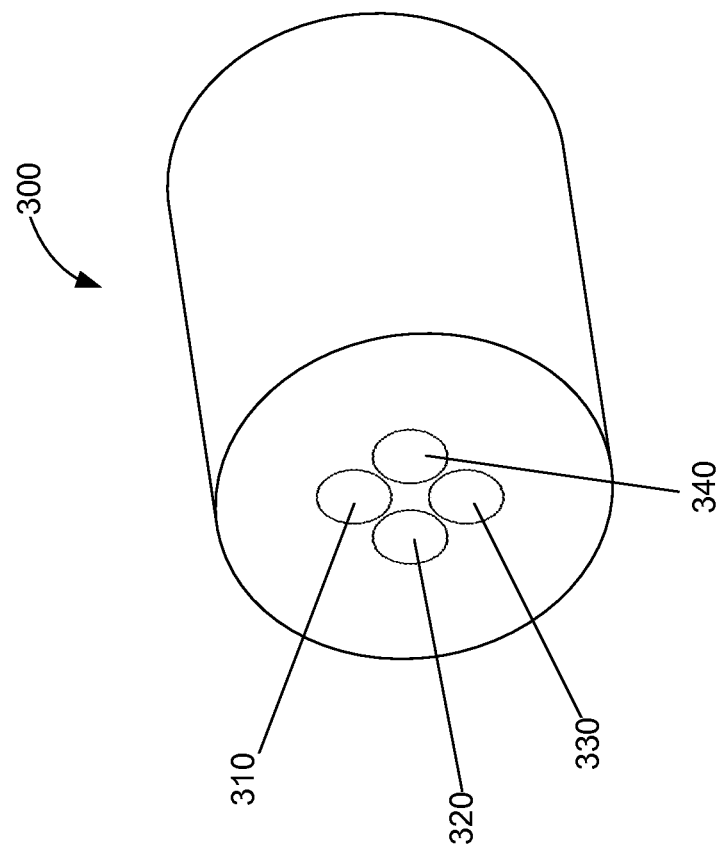
FIG. 3 illustrates a multi-core optical fiber.

In yet another embodiment, independent data streams are carried on different cores in a multi-core fiber using space-division multiplexing. FIG. 3 illustrates a multi-core fiber 300, which includes individual fiber cores 310, 320, 330, 340. Because the evanescent tails of the guided wave in each fiber core 300, 320, 330, 340 extend into the other fiber core, independent data streams carried in all the fiber cores are coupled or mixed. Polarization demultiplexing using independent component analysis is applied to the separation or demultiplexing of space-division multiplexed optical transmission.

An optical communication system using such an embodiment includes a space-division multiplexed transmitter, a space-division demultiplexed receiver, and a multicore optical fiber 300 coupling the space-division multiplexed transmitter and the space-division demultiplexed receiver. The space-division demultiplexing receiver includes an optical detector configured to convert the received signal to a corresponding electrical signal. Polarization demultiplexer logic 265 then performs space-division demultiplexing on the space-division multiplexed electrical signal by using ICA to find an inverse transformation matrix that is statistically independent, then applying the inverse transformation matrix to the space-division multiplexed electrical signal to produce a space-division demultiplexed electrical signal. Phase estimation is then performed on the polarization-demultiplexed electrical signal to recover the data stream.

Figure 4:
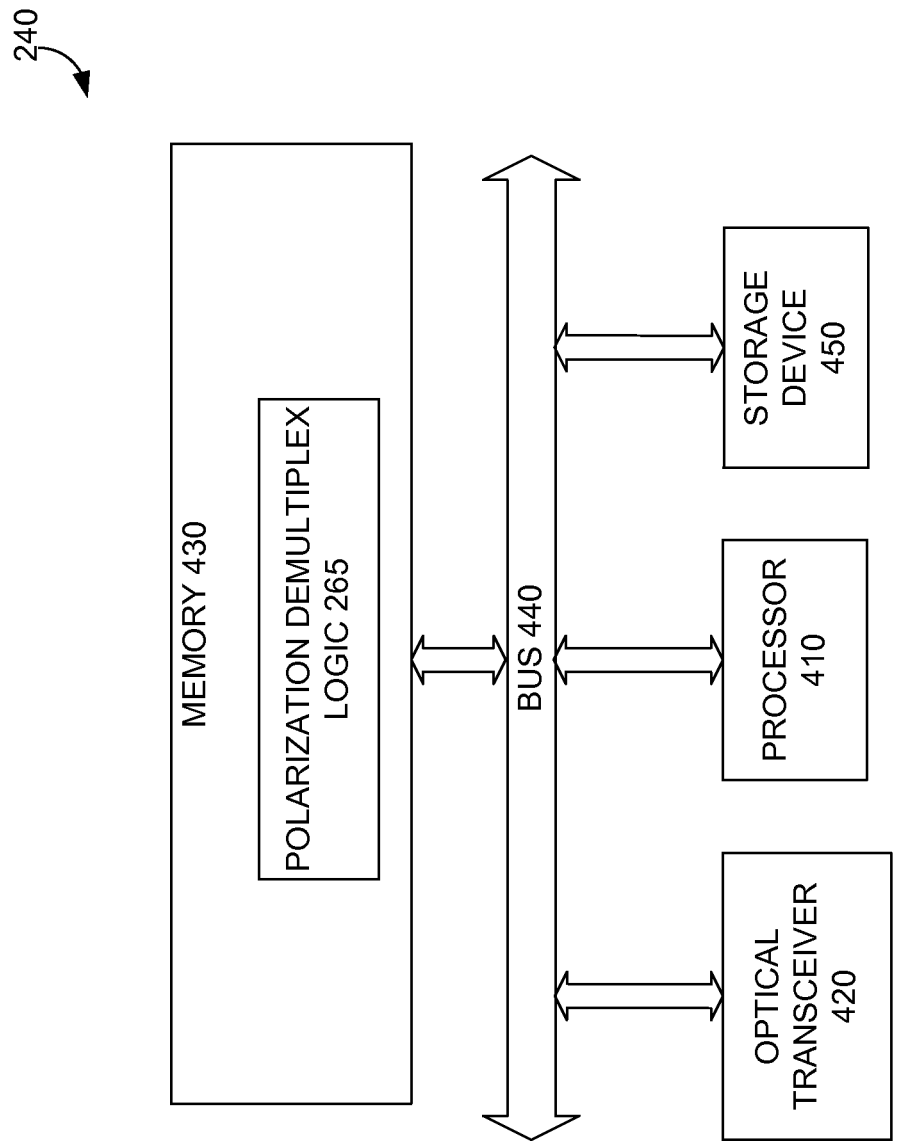
FIG. 4 is a block diagram of a receiver from FIG. 2, according to some embodiments.

FIG. 4 is a block diagram of receiver 240 according to some embodiments disclosed herein. Receiver 240 contains a number of components that are well known in the computer arts, including a processor 410 (e.g., microprocessor, digital signal processor, microcontroller, digital signal controller), an optical transceiver 420, and memory 430. These components are coupled via a bus 440. Some embodiments also include a storage device 450, such as non-volatile memory or a disk drive. Omitted from FIG. 4 are a number of conventional components that are unnecessary to explain the operation of receiver 430.

Polarization demultiplexer logic 265 can be implemented in software (i.e., instructions executing on a processor), in hardware (i.e., specialized logic), or combinations thereof. In the embodiment of FIG. 4, polarization demultiplexer logic 265 is represented as software. That is, these components reside in memory 430 as instructions which, when executed by processor 410, implement the systems and methods of fiber impairment compensation disclosed herein. In other embodiments (not shown), polarization demultiplexer logic 265 is implemented in digital logic, including, but not limited to, a programmable logic device (PLD), a programmable gate array (PGA), a field programmable gate array (FPGA), an application-specific integrated circuit (ASIC), a system on chip (SoC), and a system in package (SiP). Such digital logic implementations are not limited to pure digital but may also include analog sections or components.

Polarization demultiplexer logic 265 can be embodied in any computer-readable medium for use by or in connection with a processor. In the context of this disclosure, a "computer-readable medium" can be any means that can contain or store the instructions for use by the processor. The computer readable medium can be, for example but not limited to, a system or that is based on electronic, magnetic, optical, electromagnetic, or semiconductor technology. Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of compensating for transmission impairment, the method comprising:
   receiving a transmitted polarization-multiplexed optical signal having a plurality of polarizations, each polarization division of the transmitted polarization-multiplexed optical signal representing an independent data stream;
   converting the polarization-multiplexed optical signal to a corresponding polarization-multiplexed electrical signal;
   determining an inverse transformation matrix that meets an independent component analysis (ICA) criterion; and
   applying the inverse transformation matrix to the polarization-multiplexed electrical signal to produce a polarization-demultiplexed electrical signal; and
   phase estimating the polarization-demultiplexed electrical signal to recover the data stream;
   wherein the ICA criterion comprises Gaussianity and a high-order cumulant of the polarization-multiplexed electrical signal is used to evaluate the Gaussianity.

2. The method of claim 1, wherein the independent data stream is a digital data stream.

3. The method of claim 1, wherein the independent data stream is an analog data stream.

4. The method of claim 1, wherein a fourth-order cumulant of the polarization-multiplexed electrical signal is used to evaluate the Gaussianity.

5. The method of claim 4, wherein a kurtosis cumulant of the polarization-multiplexed electrical signal is used to evaluate the Gaussianity.

6. The method of claim 1, wherein the determining uses a tensor-based algorithm.

7. The method of claim 1, wherein the determining comprises:
minimizing a contrast function defined as $\phi=K_{1111}+K_{2222}$, where $K_{1111}$ and $K_{2222}$ are marginal kurtoses of the two orthogonal polarizations.

8. The method of claim 1, wherein the ICA criterion is $p_{xy}(E_x,E_y)=p_x(E_x)p_y(E_y)$, wherein $p_{xy}$ is a joint probability distribution function (PDF) of the two orthogonal polarizations, and $p_x(E_x)$ is a marginal PDF of a first of the two orthogonal polarizations, and $P_y(E_y)$ is a marginal PDF of a second of the two orthogonal polarizations.

9. The method of claim 1, further comprising:
performing compensation for polarization mode dispersion (PMD) by using a plurality of filters to filter the polarization-demultiplexed electrical signal, wherein the determined inverse transformation matrix supplies a plurality of coefficients for each of the filters.

10. The method of claim 1, wherein each of a plurality of elements making up the inverse transformation matrix is a complex number.

11. The method of claim 1, wherein each of a plurality of elements making up the inverse transformation matrix is a transversal filter or a tapped delayed line filter.

12. A receiver comprising:
memory containing instructions stored thereon;
a processor configured by the instructions; and
an optical detector configured to receive a transmitted polarization-multiplexed optical signal and further configured to provide a corresponding polarization-multiplexed electrical signal to the processor, each polarization division of the transmitted polarization-multiplexed optical signal representing an independent data stream;
wherein the processor is configured by the instructions to perform polarization demultiplexing on the polarization-multiplexed electrical signal by:
determining an inverse transformation matrix that meets an independent component analysis (ICA) criterion; and
applying the inverse transformation matrix to the polarization-multiplexed electrical signal to produce a polarization-demultiplexed electrical signal; and
phase estimating the polarization-demultiplexed electrical signal to recover the data stream;
wherein the ICA criterion comprises Gaussianity and a high-order cumulant of the polarization-multiplexed electrical signal is used to evaluate the Gaussianity.

13. The receiver of claim 12, wherein the processor comprises a digital signal processor.

14. The receiver of claim 12, wherein a fourth-order cumulant of the polarization-multiplexed electrical signal is used to evaluate the Gaussianity.

15. The receiver of claim 14, wherein a kurtosis cumulant of the polarization-multiplexed electrical signal is used to evaluate the Gaussianity.

16. A receiver comprising:
an optical detector configured to receive a transmitted polarization-multiplexed optical signal representing a data stream, which has been distorted in the physical domain by an optical transmission channel and further configured to provide a corresponding polarization-multiplexed electrical signal to a processor,
logic configured to perform polarization demultiplexing on the polarization-multiplexed electrical signal by:
determining an inverse transformation matrix that meets an independent component analysis (ICA) criterion; and
applying the inverse transformation matrix to the polarization-multiplexed electrical signal to produce a polarization-demultiplexed electrical signal; and
phase estimating the polarization-demultiplexed electrical signal to recover the data stream;
wherein the ICA criterion comprises Gaussianity and a high-order cumulant of the polarization-multiplexed electrical signal is used to evaluate the Gaussianity.

17. A system comprising:
a polarization-multiplexed transmitter configured to transmit a plurality of independent data streams on a polarization-multiplexed optical signal;
a polarization diversity receiver;
a multimode optical fiber coupling the transmitter and the polarization diversity receiver;
the polarization diversity receiver comprising:
an optical detector configured to receive the transmitted polarization-multiplexed optical signal and to provide a corresponding polarization-multiplexed electrical signal to a processor,
logic configured to perform polarization demultiplexing on the polarization-multiplexed electrical signal by:
determining an inverse transformation matrix that meets an independent analysis (ICA) criterion; and
applying the inverse transformation matrix to the polarization-multiplexed electrical signal to produce a polarization-demultiplexed electrical signal; and
phase estimating the polarization-demultiplexed electrical signal to recover the data stream;
wherein the ICA criterion comprises Gaussianity and a high-order cumulant of the polarization-multiplexed electrical signal is used to evaluate the Gaussianity.

18. A system comprising:
a mode-division multiplexed transmitter configured to transmit a plurality of independent data streams on a mode-division multiplexed optical signal;
a mode-division demultiplexing receiver;
a multimode optical fiber coupling the mode-division multiplexed transmitter and the mode-division demultiplexing receiver;
the mode-division demultiplexing receiver comprising:
an optical detector configured to receive the transmitted mode-division multiplexed optical signal and to provide a corresponding mode-division multiplexed electrical signal to a processor,
logic configured to perform mode demultiplexing on the mode-division multiplexed electrical signal by:
determining an inverse transformation matrix that meets a statistical independence criterion; and
applying the inverse transformation matrix to the mode-division multiplexed electrical signal to produce a mode-demultiplexed electrical signal; and
phase estimating the polarization-demultiplexed electrical signal to recover the data stream.

19. A system comprising:
- a space-division multiplexed transmitter configured to transmit a plurality of independent data streams on a space-division multiplexed optical signal;
- a space-division demultiplexed receiver;
- a multicore optical fiber coupling the space-division multiplexed transmitter and the space-division demultiplexed receiver;
- the space-division demultiplexing receiver comprising:
  - an optical detector configured to receive the transmitted space-division multiplexed optical signal and to provide a corresponding space-division multiplexed electrical signal to a processor,
  - logic configured to perform space-division demultiplexing on the space-division multiplexed electrical signal by:
    - determining an inverse transformation matrix that meets a statistical independence criterion; and
    - applying the inverse transformation matrix to the space-division multiplexed electrical signal to produce a space-division demultiplexed electrical signal; and
    - phase estimating the polarization-demultiplexed electrical signal to recover the data stream.

* * * * *